(12) United States Patent
Aguilar

(10) Patent No.: US 10,995,893 B1
(45) Date of Patent: May 4, 2021

(54) MANIFOLD FOR COMPRESSED AIR

(71) Applicant: Anthony Aguilar, Linden, MI (US)

(72) Inventor: Anthony Aguilar, Linden, MI (US)

( * ) Notice: Subject to any disclaimer, the term of this patent is extended or adjusted under 35 U.S.C. 154(b) by 0 days.

(21) Appl. No.: 16/273,718

(22) Filed: Feb. 12, 2019

(51) Int. Cl.
  *F16L 41/02* (2006.01)
  *F16L 3/137* (2006.01)
  *F04B 41/00* (2006.01)
  *F16L 29/00* (2006.01)

(52) U.S. Cl.
  CPC ............ *F16L 41/021* (2013.01); *F04B 41/00* (2013.01); *F16L 3/137* (2013.01); *F16L 29/007* (2013.01)

(58) Field of Classification Search
  CPC ........ F04B 41/00; F16L 41/021; F16L 29/007
  USPC ........................................................ 137/357
  See application file for complete search history.

(56) References Cited

U.S. PATENT DOCUMENTS

| | | | | |
|---|---|---|---|---|
| 3,151,640 A | * | 10/1964 | Teston | F16L 29/007 141/349 |
| 3,670,764 A | * | 6/1972 | Tindal | E03C 1/01 137/357 |
| 5,125,460 A | * | 6/1992 | Behrens | E21B 7/046 173/184 |
| 5,820,083 A | * | 10/1998 | Geiger | F16L 3/123 248/74.3 |
| 7,328,575 B2 | * | 2/2008 | Hedman | F15B 1/265 60/407 |
| 8,245,724 B2 | * | 8/2012 | Kissel, Jr. | F24F 7/06 137/357 |
| 2009/0241560 A1 | * | 10/2009 | Murray | B60H 1/00585 62/77 |
| 2012/0312404 A1 | * | 12/2012 | Choi | F16L 19/065 137/883 |
| 2013/0075645 A1 | * | 3/2013 | Hung | F16K 27/06 251/366 |

* cited by examiner

*Primary Examiner* — Angelisa L. Hicks
(74) *Attorney, Agent, or Firm* — L.C. Begin & Assiciates, PLLC

(57) ABSTRACT

A compressed-air distribution system contains a manifold containing a primary hose communicating with a secondary hose, and a plurality of tertiary hoses that fluidly communicate with and are connected to the secondary hose, each one of said plurality of tertiary hoses spaced apart along the length of the secondary hose, wherein each one of the tertiary hoses are independently connected to the secondary hose and in fluid communication therewith.

20 Claims, 2 Drawing Sheets

MANIFOLD FOR COMPRESSED AIR

BACKGROUND OF THE INVENTION

When working with multiple compressed-air lines, typically used for powering various automatic tools such as a roofing nailer, for example, oftentimes the plurality of associated hoses have a propensity to become tangled. As a result, the tangled hoses may lead to binding of the hoses thereby preventing fluid flow of the air through the hose. Furthermore, the tangled hose may possibly present a greater tripping hazard, as compared to untangled respective compressed-air hoses. Yet further, it is possible that the tangled hoses may result in an effective "shortening" of the hoses thereby decreasing the effective length of the hose and the resultant usefulness of the hose across a desired area. Accordingly, preventing the propensity of tangling of the hoses would be an improvement in the art

SUMMARY OF THE INVENTION

The above-referenced concerns are resolved by providing a manifold for compressed air that consists of a primary hose in fluid communication with an air compressor. A quick-release or standard coupling for connecting the primary hose to the air compressor may be used to provide compressed air from the air compressor to and through the primary hose. A secondary hose fluidly communicates with the primary hose. A plurality of secondary hose sections taken together form the secondary hose. A plurality of tertiary hoses may be provided wherein each tertiary hose is connected along the length of the secondary hose, spaced apart from other tertiary hoses, and in fluid communication with the secondary hose. A plurality of secondary hose connectors is provided wherein each secondary hose connector provides a junction for connecting a respective tertiary hose to the secondary hose.

As elaborated on below, each of the secondary hose connectors plumb the compressed air into a respective tertiary hose. Accordingly, a first fitting integral to a second hose connector is attached to a first section of the secondary hose; a second fitting integral to the second hose connector is attached to a tertiary hose; and a third fitting integral to the second hose connector may be attached to a respective continuing section of the primary hose, thereby providing fluid communication of the compressed air to additional sections of the secondary hose. In the same way, additional tertiary hoses are plumbed to associated sections of the secondary hose, thereby providing compressed air spaced apart from the primary hose, and along the length of the secondary hose.

If desired, each secondary hose connector may contain at least one valve for increasing, attenuating, or blocking the flow of compressed air to each respective tertiary hose and any secondary hose sections in fluid communication therewith.

DETAILED DESCRIPTION OF THE PREFERRED EMBODIMENTS

Figure 1:
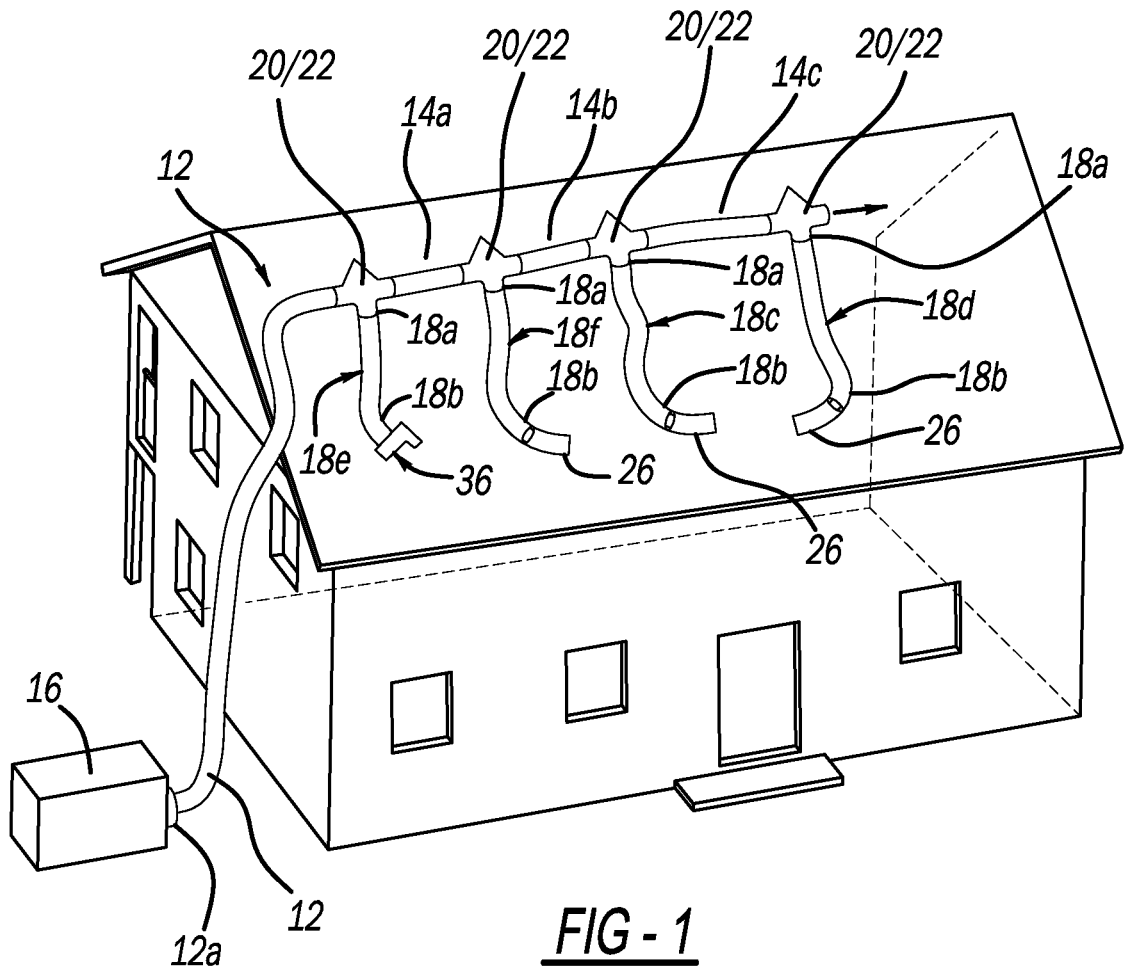
FIG. 1 is a schematic view of one embodiment of a compressed air system in accordance with the present invention.

With reference to the Figures, a compressed-air distribution system 10 contains a compressed-air manifold 12. A primary hose 12 is adapted to be in fluid communication with an air compressor 16, upon operation of the air compressor 16. In one embodiment, a quick-release or standard coupling may be attached to a first end 12a for connecting the primary or lead hose 12 to the air compressor 16, thereby providing compressed air from the air compressor 16 to and through the primary hose 12. A plurality of secondary hose sections 14a-f in fluid communication with each other and taken together form or define a secondary hose 14. A plurality of tertiary hoses 18c-h (collectively referred to as a tertiary hose 18) may be provided wherein each tertiary hose 18 is connected along the length of the secondary hose 14, spaced apart from other tertiary hoses 18, and in fluid communication with the primary hose 12 and the secondary hose 14. A plurality of secondary hose connectors 20 is provided wherein each secondary hose connector 20 provides a junction 22 for connecting a respective tertiary hose 18 to the secondary hose 14.

Each of the secondary hose connectors 20 plumb the compressed air into a respective tertiary hose 18. Accordingly, a first fitting 20a integral to a second hose connector 20 is attached or fixed to either the primary hose 12, or, to one of a connecting section 14a-f of the secondary hose 14; a second fitting 20b integral to the second hose connector 20 is attached or fixed to a first end 18a of a tertiary hose 18; and a third fitting 20c integral to the second hose connector 20 is attached or fixed to a respective continuing section of the secondary hose 14, thereby providing fluid communication of the compressed air to additional sections of the secondary hose 14, and to additional tertiary hoses 18. The exemplary fittings 20a-20c shown in the figures may, for example only, be formed as quick-release connectors, or, as other fittings that might for example be clamped to the secondary hose sections or tertiary hoses. In the same way, additional tertiary hoses 18 may be plumbed to additional sections of the secondary hose 14, thereby providing compressed air spaced apart from the primary hose 12, but along the length of the secondary hose 14. It will be appreciated that the plurality of each of these constituents may vary depending on the length of the secondary hose 14, for example. Accordingly, the number of secondary hose sections 14a-f, the number of tertiary hoses 18a-c, the number of connectors 20, and the number of any other constituent provided in a number greater than one, may be varied to modify the size and/or length of the total air distribution system across a structure such as a roof. Additionally, the length, girth, and overall size of the compressor, the primary hose, each secondary hose section 14, each tertiary hose 18, each connector 20, and/or any other constituent may be varied to accommodate greater or lesser amounts of compressed air.

Figure 2:
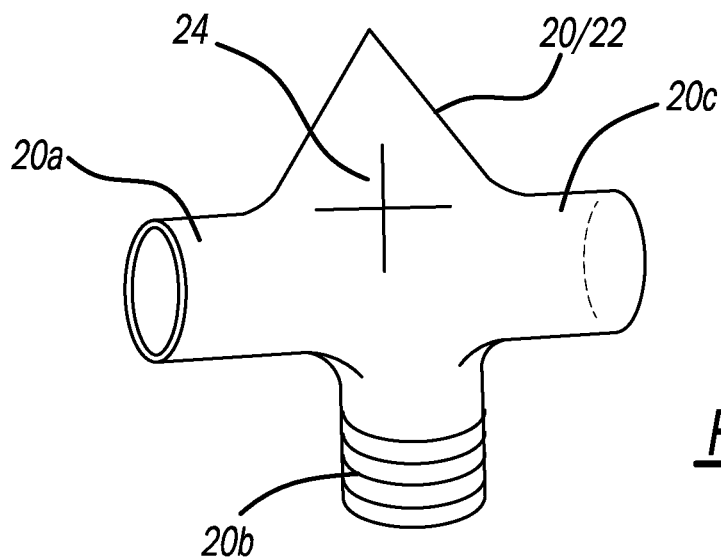
FIG. 2 is a view of a secondary hose connector of the embodiment of FIG. 1.

If desired, each secondary hose connector 20 may contain at least one valve 24 (schematically shown in FIG. 2) for increasing, attenuating, or blocking the flow of compressed air to each respective tertiary hose 18, or to each additional section 14a-f of the secondary hose 14. Accordingly, the pressure drop along any tertiary hose 18 may be increased or decreased depending on whether a tool 36 is being utilized at a second end 18b of each tertiary hose 18, thereby conserving the respective pressure of the stored compressed air of the air compressor air 16. Yet further, if desired, an extension hose 26 may be coupled to the second end 18b of one or more tertiary hoses 18, thereby increasing the effective length of each tertiary hose 18 containing an extension hose 26. Accordingly, more expansive work areas, such as a larger roof, may be safely serviced with the present compressed air distribution system 10.

Figure 3:
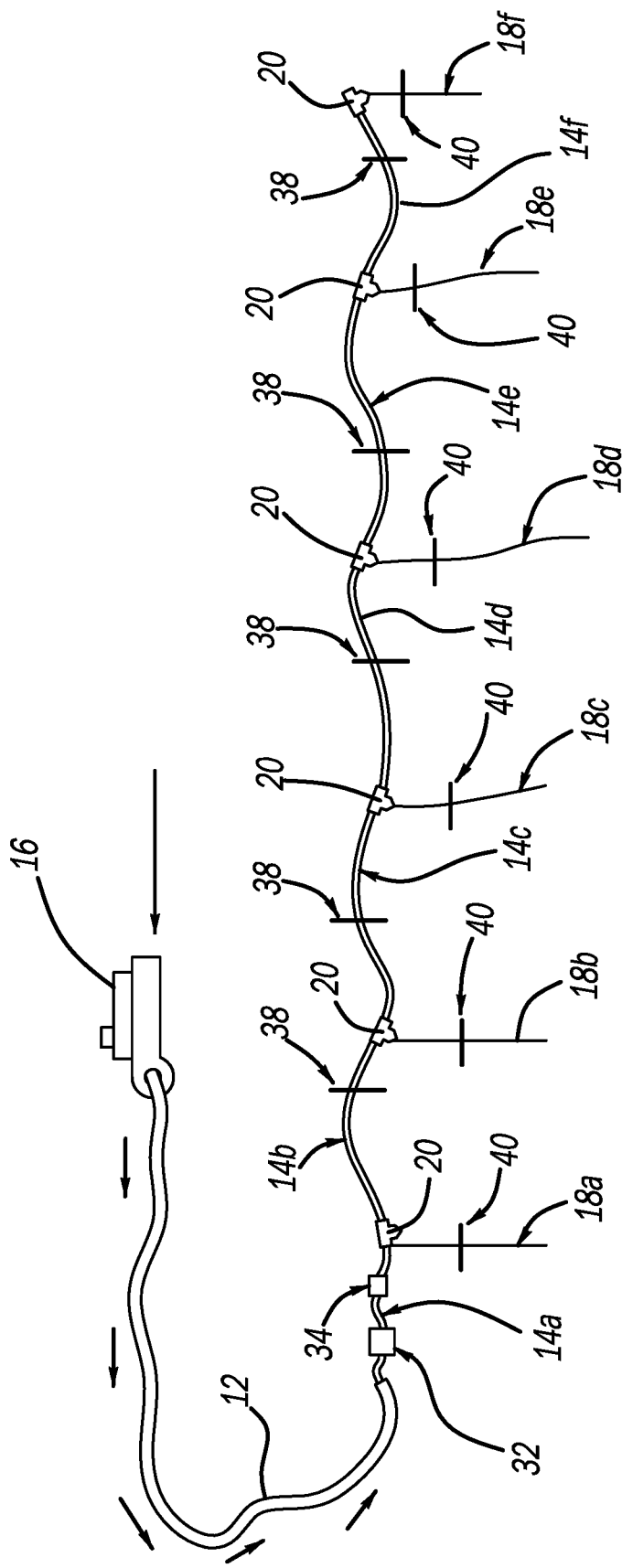
FIG. 3 is a view of a second embodiment of a compressed air system in accordance with the present invention.

In another embodiment shown in FIG. 3, an in-line oil/water separator 32 may be provided by Neiko as found on amazon.com, and is preferably connected in line to a first section 14a of the plurality of secondary hoses 14, wherein the first section 14a is connected to the lead hose or primary hose 12. The oil/water separator 32 is preferably connected within the first two to three feet of the first section 14a. A gauge 34 may be provided by Tru-Flate as located on amazon.com, and may be operably connected to the oil/water separator 32, whereby the total pressure being provided to the plurality of secondary hoses 14 may be monitored. Accordingly, the oil/water separator 32 and the gauge 34 each fluidly and operably communicate with the lead hose 12, the plurality of secondary hose sections 14a-f, and the plurality of tertiary hoses 18.

In yet another embodiment, at least one first anchor 38 may be fastened to a structure such as a housing roof, and about the secondary hose 14, to thereby secure the secondary hose 14 to the structure. If desired, a plurality of first anchors 38 may be provided wherein each one of said plurality of first anchors 38 may correspond to one of said secondary sections 14a-f, to individually anchor each secondary section 14a-f to the roof. Tripping hazards are thereby advantageously managed and minimized.

In yet another embodiment, at least one second anchor 40 may be fastened to a structure such as a housing roof, and about one of the tertiary hoses 18, to thereby secure the respective tertiary hose 18 to the structure. If desired, a plurality of second anchors 40 may be provided wherein each one of said plurality of second anchors 40 may correspond to one of said secondary sections 18c-h, to individually anchor each tertiary hose 18c-h to the roof. Again, tripping hazards are thereby advantageously managed and minimized.

The various components of the compressed-air distribution system 10 may be formed by off-the-shelf parts, or by known manufacturing processes, such as those known in the art for forming compressed air lines or hoses. The various hoses may, for example, be made from rubber or other suitable materials. The various connectors 20 may be metal-formed if made from metal, or, injection-molded if made from plastic, or otherwise formed as known in the art. The compressor may, for example only, be any compressor typically used for roofing operations. Each valve 24 may be formed as known in the art, and may be integral or in line with each connector 20.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A compressed-air distribution system comprising:
    an air compressor;
    a primary hose fluidly communicating with said air compressor;
    a secondary hose containing a plurality of sections in fluid communication with each other, the secondary hose adapted to be in fluid communication with said primary hose; and
    a plurality of tertiary hoses adapted to be in fluid communication with said primary hose, each tertiary hose independently connected to and fluidly communicating with said secondary hose, and, each one of said plurality of tertiary hoses spaced apart along the length of the secondary hose from other tertiary hoses,
    wherein said compressed-air distribution system is a non-closed system, wherein each of said primary, secondary, and tertiary hoses are flexible, and wherein said compressed-air distribution system only provides compressed air.

2. The air distribution system of claim 1 further comprising a plurality of secondary hose connectors, each of said plurality of secondary hose connectors attached to and corresponding to one of said plurality of tertiary hoses, thereby facilitating fluid flow to the respective tertiary hose.

3. The air distribution system of claim 2 wherein at least one of said secondary hose connectors comprises a first fitting attached to said primary hose or to one of said plurality of sections of said secondary hose; a second fitting attached to one of said plurality of tertiary hoses, and a third fitting attached to a second one of said plurality of sections of said secondary hose.

4. The air distribution system of claim 3 wherein at least one of said secondary hose connectors contains a valve that is adapted to increase, attenuate, or block flow to a respective secondary hose, or, to one of said plurality of sections of said secondary hose.

5. The air distribution system of claim 2 wherein at least one of said secondary hose connectors contains a valve that is adapted to increase, attenuate, or block flow to a respective tertiary hose.

6. The air distribution system of claim 2 wherein at least one of said secondary hose connectors contains a valve that is adapted to increase, attenuate, or block flow along said secondary hose.

7. The air distribution system of claim 1 further comprising a plurality of anchoring straps to anchor said secondary hose to a structure.

8. The air distribution system of claim 7 wherein each of said plurality of anchoring straps anchors at least one section of said secondary hose.

9. The air distribution system of claim 7 wherein at least one of said plurality of anchoring straps anchors at least one tertiary hose to the structure.

10. The air distribution system of claim 1 further comprising an oil/water separator connected to and in fluid communication with said secondary hose.

11. The air distribution system of claim 10 wherein said oil/water separator is connected to a first section of said secondary hose, said first section directly connected to said primary hose.

12. The air distribution system of claim 1 further comprising a pressure gauge connected to and in fluid communication with said secondary hose.

13. The air distribution system of claim 12 wherein said pressure gauge is connected to a first section of said secondary hose, said first section directly connected to said primary hose.

14. A compressed-air distribution system comprising:
    an air compressor comprising an outlet;
    a primary hose fluidly communicating with said air compressor;
    a secondary hose containing a plurality of sections in fluid communication with each other, the secondary hose adapted to be in fluid communication with said primary hose; and a plurality of tertiary hoses adapted to be in fluid communication with said primary hose, each tertiary hose independently connected to and fluidly communicating with said secondary hose, and, each one of said plurality of tertiary hoses spaced apart along the length of the secondary hose from other tertiary hoses, wherein said primary hose, secondary hose, and plurality of tertiary hoses only fluidly communicate with said compressor through said outlet, wherein each of said primary, secondary, and tertiary hoses are flexible, and wherein said compressed-air distribution system only provides compressed air.

15. The air distribution system of claim 14 further comprising at least one anchor for anchoring said secondary hose to said structure.

16. The air distribution system of claim 14 further comprising an oil/water separator connected to and in fluid communication with said secondary hose.

17. The air distribution system of claim 14 further comprising a pressure gauge connected to and in fluid communication with said secondary hose.

18. A compressed-air distribution system comprising:
an air compressor containing an outlet for providing compressed air to said system;
a primary hose fluidly communicating with said air compressor;
a secondary hose containing a plurality of sections in fluid communication with each other, the secondary hose adapted to be in fluid communication with said primary hose;
a plurality of tertiary hoses adapted to be in fluid communication with said primary hose, each tertiary hose independently connected to and fluidly communicating with said secondary hose, and, each one of said plurality of tertiary hoses spaced apart along the length of the secondary hose from other tertiary hoses; and
at least one anchor for anchoring said secondary hose to a structure,
wherein said primary, secondary, and plurality of tertiary hoses only fluidly communicate with said compressor by said outlet, wherein each of said primary, secondary, and tertiary hoses are flexible, and wherein said compressed-air distribution system only provides compressed air.

19. The air distribution system of claim 18 further comprising an oil/water separator connected to and in fluid communication with said secondary hose.

20. The air distribution system of claim 19 further comprising a pressure gauge connected to and in fluid communication with said secondary hose.

* * * * *